July 11, 1939.   R. L. KIRK   2,166,060
LOCK
Filed March 17, 1934
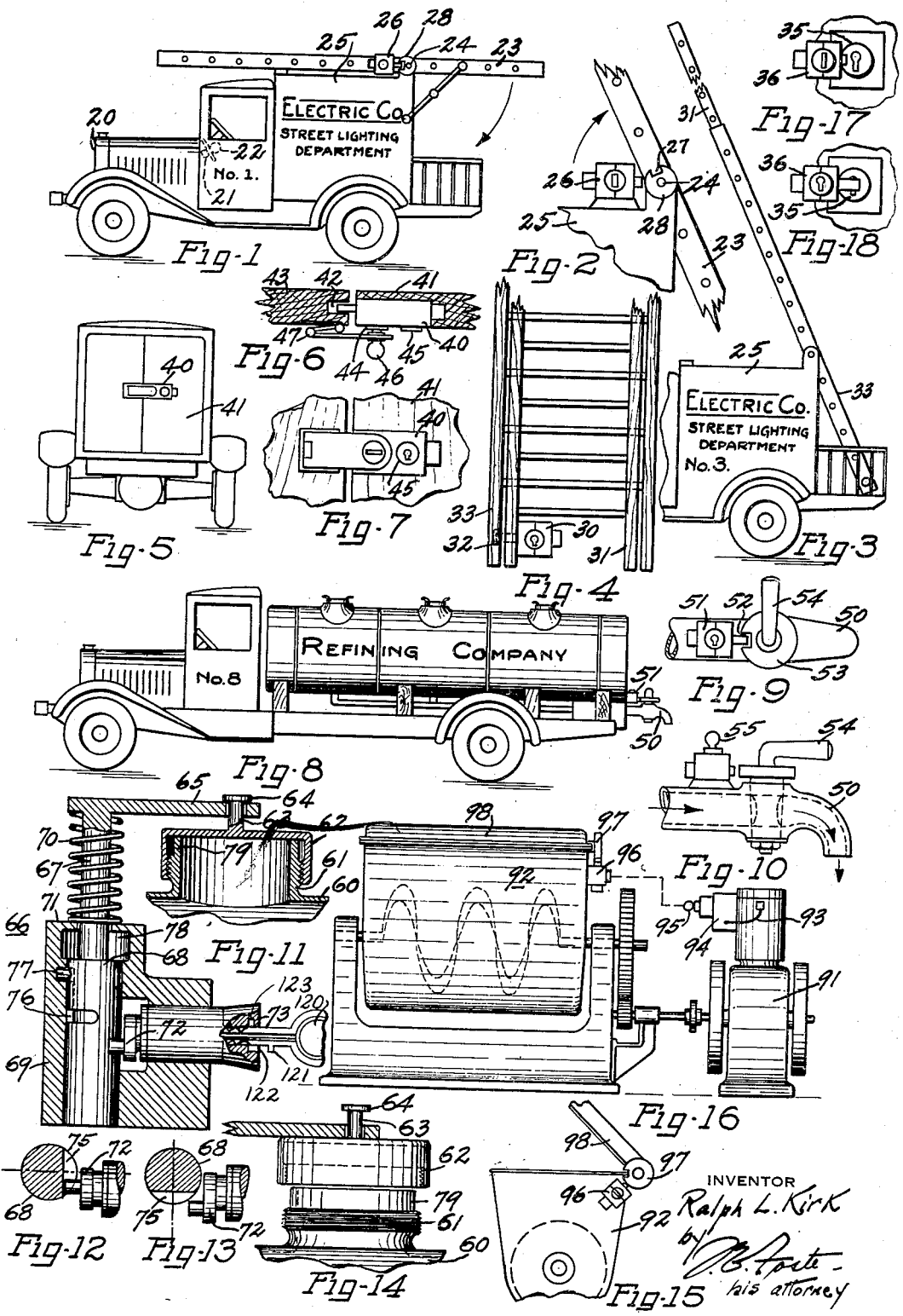
INVENTOR
Ralph L. Kirk
by
his attorney Patented July 11, 1939

2,166,060

UNITED STATES PATENT OFFICE 2,166,060

LOCK

Ralph Levering Kirk, Pittsburgh, Pa., assignor to Railway and Industrial Engineering Company, South Greensburg, Pa., a corporation of Delaware, as trustee Application March 17, 1934, Serial No. 716,213

3 Claims. (Cl. 70—170)

This invention relates to interlocking systems and particularly to interlocking systems associated with the ignition circuit of a prime mover, such as a gas engine, and apparatus associated with the gas engine, whether it is stationary or mounted on a vehicle.

One object of this invention is to provide an interlocking system between the ignition circuit of a gas engine on an automotive vehicle and an element mounted on, or as a part of, the vehicle, so that the operation of the engine will be permitted when the associated part of the vehicle is in one position, but will be prevented when the associated part of the vehicle is in a different position.

Another object of the invention is to provide an interlock system between the ignition circuit of a gas engine on an automotive vehicle and the cap of the gasoline tank, that will require that the ignition circuit be open before the gasoline tank can be opened, and that will further require that the gasoline tank be reclosed by replacing of the cap of the tank before the ignition circuit may be reclosed.

Another object of the invention is to provide an interlocking system between the ignition circuit of an automotive vehicle and the door of a closed body on the vehicle, whereby the locking of the door in closed position will be required before the ignition circuit may be established.

A further object of the invention is to provide an interlocking system between the ignition circuit of a prime mover and a machine operated thereby, so that access to any part of the machine, inspection of which might be attended by danger to the person of the inspector, may be prevented until the prime mover is rendered non-operative by locking out the ignition circuit, and mechanically locked against hand operation.

A further object of my invention is to provide an interlocking system of the foregoing character comprising separate locking devices which may be readily adapted to standard equipment that is to be protected, without requiring an excess amount of change in the construction of the equipment that is to be protected.

In a general way, my invention involves an application of locks to the ignition circuit of an engine or to the standard ignition key and to a movable part of an automotive vehicle, in such manner that the moveable part of the vehicle cannot be actuated to a desired position until the ignition circuit is open to render the engine non-operative, after which the moveable element may be moved to its desired position. An interlocking key is released when the ignition circuit is opened or rendered non-effective which may then be utilized to operate a lock to permit the operation of the moveable member of the vehicle. The movement of that member is arranged to react upon its associated lock to prevent the release of the interlocking key until the moveable member is returned to a desired safety position. The interlocking key may then be released and made available to reestablish the operative condition of the ignition circuit.

One application for which this system embodying my invention has been designed and is intended, is the truck-mounted repair ladder used for providing access to street lights, trolley wires and other similar equipment supported at a distance above the ground. One type of ladder used on such trucks is of the pivoted type which may be laid flat on top of the truck when it is not in use, so that the truck may travel freely upon any street without any danger. When use of the ladder is desired, it is rotated about its pivotal support to a vertical position, so that an operator may have access to the device to be handled or repaired.

Another type of ladder involves two telescoping sections, with one section moveable to a desired height to permit access to the apparatus to be handled, and then movable to its lowermost position where it will be below any normal dangerous height.

Another application for which my system is intended is to provide an interlock between the ignition circuit and a door of the vehicle, which it is desired to have closed before the ignition circuit may be energized.

Another application of this system involves the provision of the interlock between the ignition system and a truck mounted tank.

Another application of the system involves a provision of the interlock between an engine-driven machine and the ignition system or operating mechanism of the engine.

The various applications to which I have referred, and the manner in which the interlock system is respectively applied to them, are illustrated in the accompanying drawing in which:

Figure 1 is side elevational view of an automotive truck carrying a ladder in lowered position and provided with an interlock;

Figure 2 an enlarged view of a section of the ladder and its support showing the ladder in elevated position with a control interlock adjacent to the ladder;

Figure 3 is a side elevational view of a truck, as in Figure 1, with a ladder of the extensible type;

Figure 4 is a full elevational view of a part of the ladder showing the disposition of a control interlock on the extensible element;

Figure 5 is a rear elevational view of a delivery truck having a special lock applied to the doors;

Figures 6 and 7 are, respectively, plan and front elevational views of the special lock assembly shown on the doors of the truck in Figure 5;

Figure 8 is a side elevational view of a tank-type truck on which an interlock has been applied to the tank faucet;

Figures 9 and 10 are, respectively, plan and side elevational views of the faucet showing the arrangement of the lock with respect to the operating handle;

Figure 11 is a side view, partially in section and partially in elevation, with parts broken away, to show the application of a lock to the cap of a gasoline tank;

Figure 12 is a sectional view showing the position of the locking crank pin of the lock in Figure 11 when the bolt of the lock is in locked position;

Figure 13 is a similar view when the bolt is released;

Figure 14 is a side elevational view of the cap and the filling orifice of the gasoline tank, to show the lost motion permitted the cap to enable it to be removed;

Figure 15 is an end elevational view of a mixer provided with an interlock for the lid of the mixer;

Figure 16 is a side elevational view of the mixer and an engine for driving the mixer to which the interlock system is applied.

Figure 17 is a front elevation showing a separate lock for controlling access to the ignition lock with its bolt retracted; and Figure 18 is a similar view with the bolt of the separate lock projected.

Figure 1 and Figure 2 show the interlocking arrangement applied to a ladder of the pivoted type. Figures 3 and 4 show the application of the interlocking lock applied to a ladder of the telescoping type. As shown in Figure 1, a truck 20 is provided with the usual operating engine (not shown), the ignition circuit of which is controlled by a switch on the dashboard 21 controlled by a key 22. A repair ladder 23 is pivotally supported on a shaft 24 mounted on the body 25 of the truck. When the ladder is not in use it is placed in a horizontal position as shown in Figure 1, being normally locked in such position against casual or unauthorized displacement by a lock 26, such lock being constructed to permit removal of its key only when its lock bolt is fully extended. Such locking arrangement is effected by the extension of the lock bolt into a recess 27 in an element 28 secured to or otherwise fixedly mounted on the shaft 24.

In the foregoing application the ignition key 22 fits the tumbler of the lock 26 and must be removed from the ignition lock on the dashboard 21 in order to withdraw the bolt of the lock 26 from the slot 27 in order to permit the ladder 23 to be rotated to its vertical position. When the ladder is rotated in its vertical position and held in such position by any suitable means not shown, the bolt of the lock 26 cannot be extended sufficiently to permit the key to be withdrawn from the lock 26, since it will strike the edge of the latching element 28, and consequently, the key is held in the lock 26 so long as the ladder 23 is maintained in its vertical position. The ignition circuit is thus locked against reclosure until the key may be removed from the lock 26 which would require that the ladder be first rotated to a horizontal safety position.

When the system is used with the other type of ladder as shown in Figures 3 and 4, a safety lock 30 is mounted upon the movable or inner telescoping section 31 of the ladder in such manner as to require the bolt of the lock 30 to be withdrawn from its extended position to permit the extensible inner section of the ladder 31 to be raised to its working position. In the lower safety position of the ladder the lock bolt is adjacent a slot or groove 32 in the lower or stationary section 33 of the ladder. The lock 30 is also so constructed as to require that the bolt be extended before the key may be removed. When the bolt is withdrawn the key cannot be removed. This arrangement is thus similar to that described in connection with Figures 1 and 2 in so far as it requires, first, that the ignition circuit be open so that the ignition key may be employed to operate the lock 30 and withdraw the bolt from the stationary section 33 of the ladder, and second, that the moveable part of the ladder be lowered to safety position again before the key may be removed from the lock by extending its lock bolt, thus locking the extensible section in its lower safety position so that the key may be utilized to reestablish the ignition circuit for the engine.

In many cases the type of lock that is utilized to control the ignition circuit of the engine of the truck is unsuitable for use as an interlock as the key may be removed without interrupting the ignition circuit to stop the engine. Furthermore the ignition key may not be suitable for the lock at the ladder or excessive changes may be required in adapting such locks to the particular applications illustrated here. For that reason I prefer to employ a standardized lock especially adapted for interlocking applications as particularly described in my patent application Serial No. 692,457 filed October 6, 1933, in the United States Patent Office. I have illustrated the application of such lock to the ignition lock of an automotive vehicle in Figures 17 and 18. The standard lock 35 usually supplied with the automotive vehicle is not touched or modified in any manner whatsoever. At the side of the standard lock 35, however, I mount a lock 36 of my construction similar to lock 26 shown in Figures 1 and 2 and lock 30 in Figure 4. The lock 36 is mounted adjacent to the tumbler of the motor lock 35 so that when the bolt of lock 36 is withdrawn the ignition key of the lock 35 may be freely rotated to establish the ignition circuit. When the lock 36 is operated to extend its bolt, however, the keyhole of lock 35 is covered and access to that lock by the standard ignition key is prevented, as shown in Figure 18.

When a separate lock 36 is employed, as shown in Figures 17 and 18, it also serves as a secondary protection for the ignition lock since the bolt of the lock 36 will be extended when its key is removed and, in fact, must be extended to permit its key to be removed. When the standard ignition key is to be inserted in its lock 35 the bolt of lock 36 must be withdrawn. The ignition key can then be inserted in lock 35 to operate the vehicle. When the ladder of the vehicle is to be moved from safety position to operating position the interlock key must be removed from the lock 36 to permit access to the lock 26 or 30 at the ladder. The operation of the lock 36 thus requires the removal of the ignition key which insures the disconnection of the ignition circuit.

With the arrangement described, as shown in Figures 17 and 18, a separate interlock system is provided that requires no modification of the automotive equipment as normally manufactured.

Where the ignition key is not locked in position during use, but may be removed without opening the ignition circuit, the lock will be applied to any other element which controls the ignition circuit.

Another application of the interlock system is to the back door of the delivery truck to insure that the door is always locked closed before the ignition circuit may be established to drive the vehicle under its own power. This arrangement is illustrated in Figures 5, 6 and 7. This door application involves the use of two keys which will require the absolute reclosure of the doors before the interlocking key may be removed.

As shown in Figures 6 and 7, a two tumbler lock 40 is mounted on one door 41 in such position that its bolt when extended will extend into a recess 42 in the other door 43. When the bolt is withdrawn by the lock 40 it will be clear of the recess 42 so that the doors may be moved relatively to each other. As already mentioned, the lock 40 is provided with two tumblers 44 and 45 respectively. The tumbler 45 is to be operated by the interlock key from the ignition switch lock as in Figure 1 or from the auxiliary lock associated with it as in Figures 17 and 18. The tumbler 44 is to be operated by a key 46 permanently secured to the door 43 on a hinged pivotally folded bracket 47.

When the doors 41 and 43 are to be opened the interlock key at the dashboard is removed thereby insuring the disconnection of the ignition circuit and it is then inserted into the tumbler 45. The interlock key in tumbler 45 and the key 46 in tumbler 44 may now be jointly operated to open the lock 40 and to withdraw the bolt from the groove 42 in the door 43. After the bolt is withdrawn in the lock 40 the key 46 may be removed from its tumbler 44 and readily withdrawn from the tumbler by reason of the pivotally supporting bracket 47. The interlock key will not be retained in its tumbler 45 until both tumblers are again operated to extend the bolt. That cannot be done, however, until the key 46 is inserted into the tumbler 44, which condition requires that the two doors be placed in such position that when the lock 40 is operated to extend the bolt, the bolt will enter the groove 42 and lock the two doors closed. The key 46 is supported in its bracket 47 to permit free rotary movement but is otherwise positioned against removal from the bracket 47. Key 46 can only be removed when the lock bolt is withdrawn from recess 42 and the interlock key when it is extended into recess 42. Both keys must be in lock 40 before it can be operated.

In Figures 8 and 9, I have illustrated the application of the safety interlocking arrangement to a spigot or valve 50 on a tank for liquids such as oil, milk or the like. The arrangement at the ignition lock on the dashboard is similar to either one of those already described in Figure 1 and in Figures 17 and 19. At the spigot a lock 51 is provided and disposed in such position that its bolt when extended will extend into a groove of a latching plate 53 secured to the handle 54 of the spigot. The groove 52 is so located that the spigot will be locked in a closed position when the bolt is extended into that groove. In this case as before, the key can be removed from the lock 51 only when the bolt is extended and is held against removal from the lock when the bolt is withdrawn, as is illustrated by the key 55 in Figure 10. The handle 54 must thus be moved to the closed position of the spigot before the lock 51 can be operated to extend the bolt to permit the key 55 to be removed to reestablish the ignition circuit.

In Figures 11 to 14, inclusive, I have illustrated the application of the protective interlocking system to the cap on the gasoline tank of the automotive vehicle. As shown in those figures, the gasoline tank 60 is provided with a threaded stem 61 upon which a threaded cap 62 is mounted to close the tank, and which may be removed to permit access to the tank when gasoline is to be placed in the tank. The cap 62 is provided with a centrally located stem 63, the outer end of which is enlarged to provide a button head 64 to prevent the cap from being displaced from its supporting arm 65, while at the same time permitting a certain amount of free play or lost motion between the cap 62 and the supporting arm 65. The other end of the supporting arm 65 is controlled by a lock 66 in such manner as to require the operation of the lock to open position before the cap may be unscrewed. After that the operation of the lock is made dependent upon the cap being placed in lowered position above the tank opening. The operating connection between the arm 65 and the lock 66 to accomplish this result is established through a vertical stem 67 that constitutes an extension of the lock bolt 68 having limited reciprocal and rotary movement in a cylindrical passage in the casing or housing 69. The arm 65 is normally biased to its upper position by means of a helical spring 70 which is disposed around the stem 67 between the arm 65 and the top surface 71 of the casing 69. Operation of the bolt is controlled by a crank pin 72 in response to movement of the key in the tumbler 73 of the lock.

The arrangement is such that the key 120 shall not be capable of withdrawal from the tumbler 73 of the lock unless and until the cap 62 is directly above the stem 61 and pressed downward upon the stem 61 with the arm 65 in its lowermost position so that the cap covers the stem 61 even though it may not be entirely screwed down to its tight closed position. In order to establish this restraint upon the operation and withdrawal, the bolt 68 is provided with a short horizontal slot through a sector 75 to receive the crank pin 72 when the bolt 68 is in proper position. In order to limit the permissible rotary movement of the cap while the tank is being filled the bolt 68 is also provided with an L-shaped slot 76 which operates with a limiting stop and guide pin 77 to control the permitted movement of the bolt 68. The key 120 is retained against withdrawal from the key barrel except in the locking position by a guide and positioning pin 121 adjacent the key head. When the key is inserted into the barrel, the pin 121 enters a gate 122 at the mouth of the barrel casing, if the key is in proper position. When the key is thus inserted and rotated to unlock the lock, the pin 120 moves into an annular groove or channel 123 so that the key cannot be withdrawn until the pin 121 is returned to the position opposite the gate 122.

When the tank is to be filled the interlock key is withdrawn from the dashboard and inserted into the tumbler 73 of the lock 66. The cap 62 is then unscrewed from the stem 61 so that the lock may be operated to permit the lock bolt 68 to be raised to its upper position both by the operation of the key in the tumbler and the raising force of the spring 70. The bolt moves to its upper position, the extent of such movement being limited to a predetermined extent according to the height of the chamber 78 above the bolt 68 in the casing 69 of the lock. In such upper position the cap, after being unscrewed from the threaded portion of the stem 61 may be raised sufficiently high to clear the unthreaded extension 79 of the stem 61, as illustrated in Figure 14. The cap may then be rotated around the axis of the bolt 68 away from the opening of the stem 61 to permit access to the tank for introducing gasoline into the tank. After the tank has been filled the cap must be replaced before the key can be removed from the lock tumbler 73 for the reason that the crank pin 72 can not be rotated to its normal locking position of Figure 12 due to the fact that it will strike the periphery of the bolt, as shown in Figure 13, below the slot 75. Before the tumbler can be rotated to reinsert the crank pin 72 into slot 75 the bolt 68 must be both rotated to the position where it is directly above the opening in the tank stem 61 and must then be lowered to a position at which the pin 72 will enter the slot 75. When these conditions are established the cap is down over the extension 79 of the tank stem even though it may not be screwed into place. In fact the design may be such that a screw cap is unnecessary, the connection being made by the downward motion of the cap and its seating on the stem. Access to the tank, however, which is the thing that is desired is now prevented and the key will now be removed from the tumbler 73 of the lock so that it may be restored to the dashboard to permit reestablishment of the ignition circuit.

In Figures 15 and 16 I have illustrated the application of the interlock system to a stationary gas engine 91 or other equivalent prime mover having an ignition circuit. In this application the gas engine is illustrated as operating a mixing machine such as a dough mixer or pug mill 92. Because of the nature of the machine it is desirable that operation of the engine may be prevented when access is had to the mill for the purpose of repairs or inspection or the like.

In order to provide the safety interlocking system for this application the ignition circuit 93 is controlled by a key operable lock 94 from which the key may be removed only when the lock opens the circuit. The key 95 may then be employed to operate a lock 96 on the mixer so that its bolt may be withdrawn from a locking plate 97 associated with the lid 98 of the mixer. The key will be held in the lock 96 in a manner similar to that already previously described in the other applications so long as the door 98 is held in its open position. The key to the ignition circuit is thus made unavailable so long as the door 98 is open, and is not made available until the door 98 is reclosed to permit the lock 96 to be operated to reextend the bolt into the locking plate 97.

My invention is not limited to the particular applications illustrated nor to the specific arrangements that are shown, since all of these may be variously modified without departing from the spirit and scope of the invention as set forth in the appended claims.

I claim:

1. In an automotive vehicle, the combination with a gasoline tank and a closure cap therefor, of a lock for the cap, a key for the lock, means associated with the lock and the cap for permitting removal of the cap only when the lock is unlocked, and means associated with the lock for preventing operation of the lock while the cap is removed from closure position on the tank, and means for retaining the key in the lock until the cap is moved to closing position on the tank, and releasing the key only when the cap is locked in closing position on the tank.

2. In an automotive vehicle, the combination with a gasoline tank and a closure cap therefor, of a lock for the cap, a key for the lock, and means associated with the lock and the cap for permitting removal of the cap only when the lock is unlocked, and means associated with the lock for then retaining the key in the lock until the cap is moved to closing position on the tank, and releasing the key only when the cap is locked in closing position on the tank.

3. In an automotive vehicle, the combination with a gasoline tank and a closure cap therefor, of a lock for the cap, a key for the lock, means associated with the lock and the cap for preventing removal of the cap except when the lock is unlocked and for preventing operation of the lock except when the cap is in closing position on the tank, and means for retaining the key against withdrawal from the lock except when the cap is locked in closing position on the tank.

RALPH LEVERING KIRK.